Nov. 12, 1935.   A. J. MYHREN ET AL   2,020,325
METHOD OF PRODUCING PRECIPITATES
Filed Dec. 15, 1933
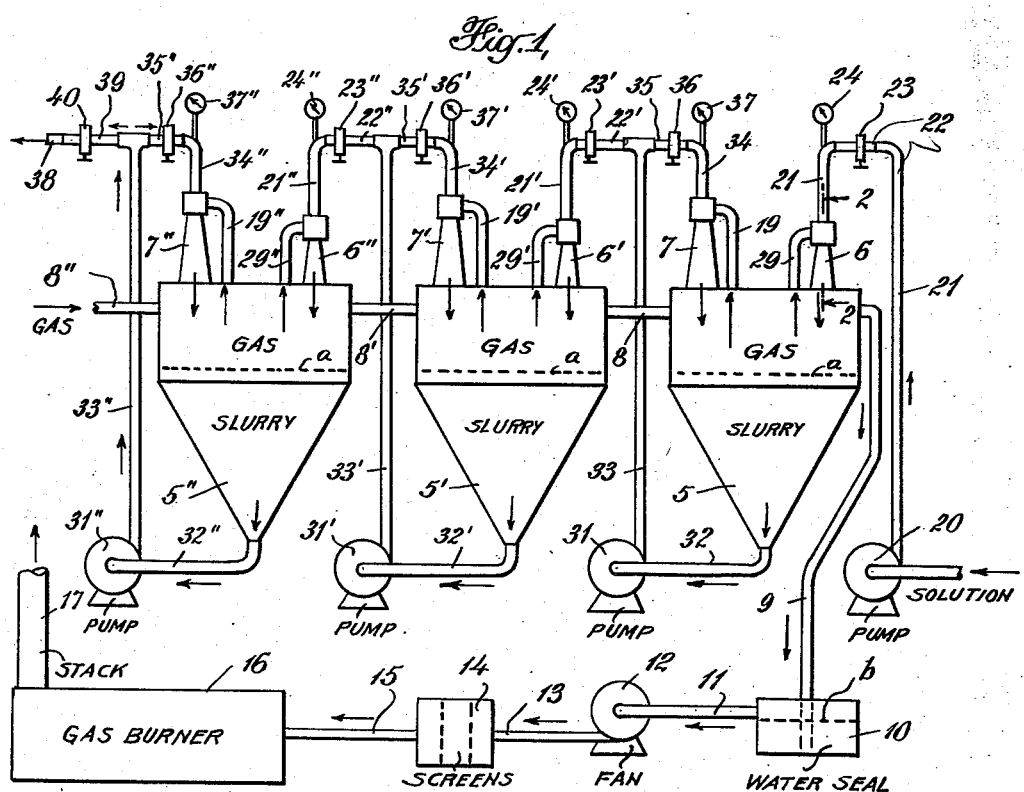
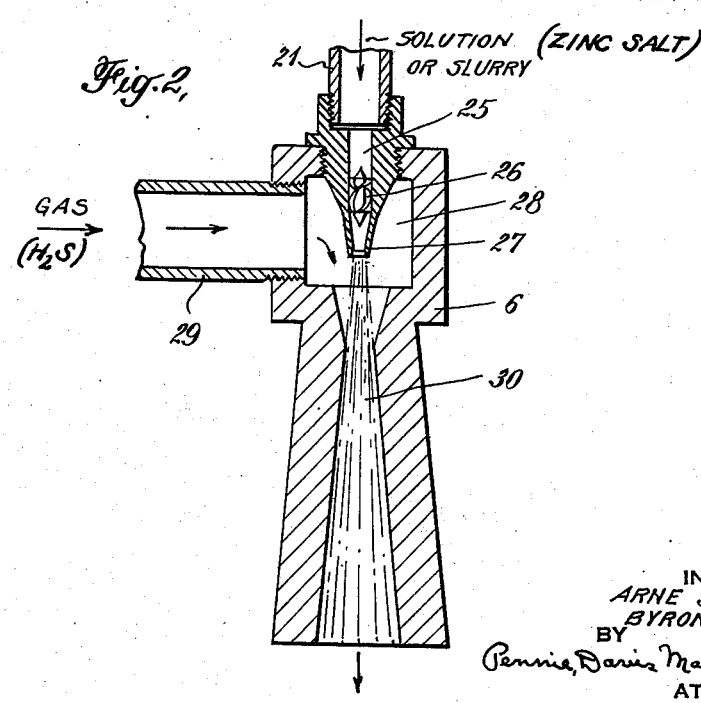
INVENTORS
ARNE J. MYHREN,
BYRON MARQUIS.
BY Pennie, Davis, Marvin & Edmonds
ATTORNEYS Patented Nov. 12, 1935

2,020,325

UNITED STATES PATENT OFFICE 2,020,325

METHOD OF PRODUCING PRECIPITATES

Arne J. Myhren and Byron Marquis, Palmerton, Pa., assignors to The New Jersey Zinc Company, New York, N. Y., a corporation of New Jersey Application December 15, 1933, Serial No. 702,578

23 Claims. (Cl. 23—135)

The present invention relates to the production of precipitates, and has for its object the provision of an improved method of producing precipitates by the reaction of a gas with a solution, for example by the reaction of carbon dioxide with lime-water (solution of calcium hydroxide) to form a precipitate of calcium carbonate, or by the reaction of hydrogen sulfide with solutions of compounds capable of reacting with hydrogen sulfide gas to form a sulfide precipitate, for example a solution of zinc sulfate (which reacts with hydrogen sulfide as follows: $ZnSO_4+H_2S=ZnS+H_2SO_4$) or of cadmium sulfate (which reacts with hydrogen sulfide as follows: $CdSO_4+H_2S=CdS+H_2SO_4$).

The invention more particularly contemplates the production of a zinc sulfide precipitate that can be worked up to zinc sulfide pigment by aging, calcination, quenching in water etc. In a preferred embodiment of this application of the invention, zinc sulfate solution is brought into reaction with hydrogen sulfide gas by mixing in an eductor (preferably of the Venturi type) with repeated mixing of the resulting slurry with hydrogen sulfide gas (also preferably in an eductor) under conditions insuring intimate contact of the slurry and gas. This preferred embodiment of the invention will be described herein, as an example.

Further objects of the invention in its application to the production of a zinc sulfide precipitate are the provision of (1) A method for intimately mixing zinc sulfate solution with relatively large volumes of hydrogen sulfide gas by causing a current of zinc sulfate solution to entrain by suction, for example in Venturi tube eductors, hydrogen sulfide gas, which is thereby brought into intimate contact with the zinc sulfate solution.

(2) A method by which zinc sulfate solution (or a slurry consisting of zinc sulfide precipitate in suspension in an aqueous solution of zinc sulfate and sulfuric acid) is repeatedly brought into intimate contact with hydrogen sulfide gas in the manner described in item 1.

(3) A method whereby hydrogen sulfide gas and zinc sulfate solution, or a slurry as described in item 2, are repeatedly recirculated in intimate contact, the hydrogen sulfide gas being entrained by suction by the zinc sulfate solution or slurry in the manner described in item 1.

(4) A method whereby a current of hydrogen sulfide gas and a current of zinc sulfate solution (or slurry) flowing in general countercurrent are brought into intimate contact by the methods described in items 1, 2 and 3.

In the preferred practice of the invention the zinc sulfate solution and hydrogen sulfide gas are mixed in Venturi precipitators, that is to say eductors of Venturi tube type, so constructed and operated that the zinc sulfate solution is brought in the form of thin films into contact with relatively large volumes of hydrogen sulfide gas. The reaction between the hydrogen sulfide and the zinc sulfate solution is facilitated and accelerated by the intimacy of contact so obtained. The limiting factor of the velocity of this reaction is the rate at which hydrogen sulfide is dissolved in the zinc sulfate solution. The greater the surface of contact between hydrogen sulfide gas and zinc sulfate solution, the more rapidly will the hydrogen sulfide dissolve in the zinc sulfate solution. Once the solution of hydrogen sulfide in the zinc sulfate solution has occurred, the formation of sulfide ions occurs with great rapidity and the reaction of sulfide ions with the zinc ions already in the solution to form zinc sulfide precipitate likewise occurs with great rapidity.

A further advantageous feature of the process of the invention is that the precipitation is accelerated by keeping the zinc sulfate solution cool (at or near room temperature for example), hydrogen sulfide being more soluble in cold aqueous solutions than in hot aqueous solutions.

In this practice of the invention the Venturi precipitators discharge the zinc sulfate solution (or slurry) and hydrogen sulfide gas into tanks appropriately closed so as to retain the hydrogen sulfide gas.

The invention will be more readily understood from the following description taken in conjunction with the accompanying drawing, in which:

Fig. 1 is a diagrammatic elevation of a suitable apparatus for the practice of the invention.

Fig. 2 is a section on the line 2—2 of Fig. 1, showing in detail the construction of the Venturi tube eductor 6, and likewise of the eductors 6', 6", 7, 7' and 7" in Fig. 1.

The apparatus illustrated in the drawing comprises three tanks 5, 5', 5" (arranged in series), of circular cross-section and with conical bottoms, each tank being provided with two Venturi tube eductors 6 and 7, 6' and 7' and 6" and 7", respectively. The series of tanks is provided with a gas inlet pipe 8" (entering the top portion of tank 5") and a gas outlet pipe 9 (discharging from tank 5). A gas pipe 8' connects the top portions of tanks 5" and 5' and a gas pipe 8 connects the top portions of tanks 5' and 5. The system of pipes 8'', 8', 8 and 9 connects the tanks in series at points above the normal level (a) of liquid or slurry therein in such fashion that gas can flow freely through the series of tanks.

The gas outlet pipe 9 dips below the liquid-level (b) in a water seal 10. The gas-space above the liquid-level (b) in the water seal 10 is connected by a pipe 11 with the suction side of a fan 12. The pressure side of the fan 12 is connected by a pipe 13 with a screen-box 14, which contains metal screens (preferably made of a metal of high heat conductivity such as copper) set across the path of the gases therethrough. The screen box 14 is connected by a pipe 15 to a gas burner 16, provided with a stack 17.

It is to be understood that the screen box 14 and the burner 16 are of particular utility when the gas utilized is combustible. In that case, the metal screens in the box 14 prevent back-firing of the flame in the gas burner 16. In case the gas used is not combustible, the screen box 14 and the burner 16 may be dispensed with. The water seal 10 is of utility not only as a further safe-guard against back-firing, but also as a means of regulating the effective suction of the fan 12. The effective suction of the fan 12 on the outlet pipe 9 may be increased by lowering the water-level (b) in the water seal 10, and decreased by raising the water level. Moreover, the water seal 10 prevents the entrance of air into the tank 5 when the fan 12 is shut down, for example for the purpose of attaching a spare fan.

The tanks 5, 5' and 5'' are provided with pumps for liquid and/or slurry transport, and pipe lines for liquid or slurry are appropriately connected with the pumps, tanks, and Venturi tube eductors in such fashion that liquid and/or slurry can be transported through the series of tanks and likewise partly recirculated in the individual tanks, while being brought into intimate contact with gas traversing the series of tanks in general counter-current with the liquid and/or slurry. Each of the six Venturi tube eductors (6, 7, 6', 7', 6'' and 7'') is arranged to recirculate gas through the tank with which it is operatively associated, while intimately mixing the gas with the liquid and/or slurry. The Venturi tube eductor 6 introduces liquid into the system by discharging it into tank 5. The Venturi tube eductors 7, 7' and 7'' serve to recirculate liquid or slurry through the tanks with which they are connected (through tanks 5, 5' and 5'', respectively). The Venturi tube eductors 6' and 6'' serve to convey liquid or slurry from one tank into the next tank in the series. Thus, Venturi tube eductor 6' serves to convey liquid or slurry (withdrawn from tank 5) into tank 5'; and Venturi tube eductor 6'' serves to convey liquid or slurry (withdrawn from tank 5') into tank 5''.

The apparatus shown in Fig. 1 will now be described in greater detail:

A pump 20 is connected on its suction side to a source of liquid (not shown). On its pressure side, the pump 20 is connected with a pipe 21, part of which consists of the rubber hose segment 22, provided with a pinch valve 23. The pipe 21 leads to the Venturi tube eductor 6. Between the pinch valve 23 and the eductor 6, the pipe 21 is provided with a pressure gauge 24, for indicating the rate of delivery of liquor to the Venturi tube eductor 6.

The structure of the Venturi tube eductor 6 will be more clearly understood by reference to Fig. 2. The pipe 21 connects with a duct 25, in which is placed a spiral baffle 26. The duct 25 terminates in a discharge nozzle 27 in a gas chamber 28, connected by a pipe 29 to the upper portion of the tank 5 (i. e., the portion of the tank 5 above the line of normal slurry or liquid level a therein). The nozzle 27 is placed concentrically with a Venturi tube 30 communicating with the gas-chamber 28 at a point opposite the nozzle 27.

Referring again to Fig. 1, the suction side of a pump 31 is connected by a pipe 32 to the discharge orifice at the tip of the conical bottom of tank 5. The pressure side of pump 31 is connected to a pipe 33, dividing at its upper end into a branch pipe 34 leading back into the tank 5 through the Venturi tube eductor 7, and into branch pipe 21', leading into the Venturi tube eductor 6'. The branch pipe 34 is provided with the rubber hose segment 35, equipped with the pinch valve 36, and is also provided with the pressure gauge 37, between the pinch valve 36 and the Venturi tube eductor 7. The branch pipe 21' is likewise provided with a rubber hose section 22' equipped with a pinch valve 23', and provided with a pressure gauge 24' between the pinch valve 23' and the Venturi tube eductor 6'. It will be readily understood that the relative amounts of liquid (or slurry) entering the branch pipes 34 and 21', respectively, can be appropriately regulated, as hereinafter more particularly explained, by appropriate adjustment of the pinch valves 23' and 36, respectively; and that the relative amounts of liquid or slurry flowing through the pipes 21' and 34 can be determined at any time by comparing the reading of the gauges 24' and 37.

The structure of the Venturi tube eductors 6', 7, 7' etc. is the same as that of Venturi tube eductor 6 hereinbefore described. Pipes 19, 19' and 19'' connect the upper portion of the tanks 5, 5' and 5'' with the gas chamber of the Venturi tube eductors 7, 7' and 7'', respectively.

The structure and arrangement of the pump 31', pipes 32' and 33', branch pipe 34' with the rubber hose segment 35', pinch valve 36' and gauge 37', branch pipe 21'' with the rubber hose segment 22'', pinch valve 23'' and gauge 24'', and the Venturi tube eductors 7' and 6'', are the same with respect to tanks 5' and 5'' as the structure and arrangement of the correspondingly identified elements described with respect to tanks 5 and 5'.

The pump 31'' is connected on its suction side to the pipe 32'' communicating with the discharge orifice in the conical bottom of the tank 5''. The pressure side of the pump 31'' is connected to the pipe 33'', which divides into the branch pipe 34'' (connecting with the Venturi tube eductor 7'') and branch pipe 38, which serves as an outlet for the discharge of liquid or slurry from the system. The branch pipe 34'' is provided with the hose segment 35'', having the pinch valve 36'', and with the pressure gauge 37''. The discharge pipe 38 is provided with a hose segment 39, equipped with a pinch valve 40. It will be understood that the relative amounts of liquid or slurry discharged through the pipe 38 and returned to the tank 5'' through the Venturi tube eductor 7'' can be regulated by appropriate adjustment of the valves 40 and 36'', and that the amount of liquid or slurry entering the Venturi tube eductor 7'' can be determined at any time by reading the gauge 37''.

The apparatus shown in the drawing is operated as follows for producing a zinc sulfide precipitate by the reaction of hydrogen sulfide and zinc sulfate solution:

Hydrogen sulfide is introduced into the series of tanks through the inlet 8″, and circulated in succession through tank 5″, pipe 8′, tank 5′, pipe 8, tank 5, outlet pipe 9 and water-seal 10 by the suction produced by the fan 12. The effective suction of the fan 12 can be adjusted and regulated by suitable adjustment of the water-level $b$ in the water-seal 10. It will be understood that the absorption of hydrogen sulfide by solution in, and reaction with, the zinc sulfate solution likewise tends to draw gas into the system through the pipe 8″ by suction. The water-seal 10 prevents air from entering the system when the fan 12 is shut down for any reason, as for example for the purpose of attaching a spare fan to the gas outlet line 9.

The fan 12 forces the gas through the line 13, the screen box 14 and the line 15 to the gas burner 16. The products of combustion (e. g. sulfur dioxide) are removed from the burner 16 by the stack 17. Back-firing of flame from the burner 16 into the system is guarded against by metal screens (made of a metal of high heat conductivity, e. g. copper) placed in the path of the gases in screen-box 14. The water-seal 10 is a further safe guard against back-firing.

Purified zinc sulfate solution is introduced (preferably continuously) into the system by pump 20, which delivers solution to the Venturi tube eductor 6 through the pipe 21. The amount of solution transported by the pump 20 through the pipe 21 can be regulated by adjustment of the pinch valve 23 on the hose segment 22. The rate of flow of solution into the Venturi tube eductor 6 is indicated by the pressure gauge 24, connected in the pipe line 21 at a point between the Venturi tube eductor 6 and the pinch valve 23.

From the pipe 21, the solution enters the duct 25 of the Venturi tube eductor 6. A swirling motion is imparted to the solution flowing through the duct 25 by the spiral baffle 26. The swirling stream of solution then passes through the nozzle 27 in the form of a conical expanding jet into the gas chamber 28. The jet traverses the gaschamber 28 and enters the Venturi tube 30, which is concentric and coaxial with the nozzle 27. In the Venturi tube 30, the velocity of the jet of solution is sufficiently increased by the constriction of the Venturi tube to create suction in the gas chamber 28. Hydrogen sulfide gas is thus withdrawn from the gas-chamber 28 by the suction of the Venturi tube and by entrainment in the jet of solution. The suction in the gas-chamber 28 draws hydrogen sulfide gas through the pipe 29 into the gas-chamber from the upper part of the tank 5. The Venturi tube 30 discharges this gas, together with a slurry of zinc sulfide precipitate formed by reaction of the gas with the solution, into the tank 5. The gas is brought into intimate contact with the solution in the form of thin films and small droplets in the Venturi tube 30 so that the reaction between hydrogen sulfide and zinc sulfate is initiated, with formation of a slurry of zinc sulfide, zinc sulfate and sulfuric acid solution. The Venturi tube eductor is preferably so operated as to entrain with the solution a volume of gas greatly in excess of the volume of solution; for example, the volume of hydrogen sulfide gas carried through the Venturi tube eductor by the solution may be from 25 to 50 times the volume of the solution, or even more.

The slurry charged into the tank 5 through the Venturi tube eductor 6 is withdrawn from the orifice in the conical bottom of the tank through the pipe 32 by the pump 31, which forces the slurry through the pipe 33, into the branch pipes 34 and 21′. The relative amounts of slurry flowing into these two branch pipes are regulated by appropriate adjustments of the pinch valves 36 and 23′; the pressure gauges 37 and 24′, respectively, indicate the prevailing pressures and thus the rates of flow in these two branch pipes. The slurry entering the Venturi tube eductor 7 is mixed therein with hydrogen sulfide gas taken from the tank 5, and then returned to tank 5. The Venturi tube eductor 7 functions with respect to mixing the gas and slurry in the same manner as the Venturi tube eductor 6. The slurry entering the branch pipe 21′ passes into the Venturi tube eductor 6′, which functions in the same manner as Venturi tube eductor 6, with respect to mixing the slurry with gas (except that, as will be obvious from the figure, the Venturi tube eductor 6′ draws gas through its gas-pipe 29′ from the tank 5′). The Venturi tube eductor 6′ discharges slurry into tank 5′ and thus transports slurry from tank 5 to tank 5′; while the Venturi tube eductor 7 returns slurry to tank 5.

It will be understood that in order to secure a desirable uniform and constant flow of slurry through the apparatus, the Venturi tube eductor 6′ must transfer to the tank 5′ an amount of slurry corresponding to that entering the tank 5 through the Venturi tube eductor 6. The rate of discharge of Venturi tube eductor 6′ may be suitably controlled with this object in view by appropriate adjustment of the pinch valves 36 and 23′.

It will also be understood that the capacity of the pump 31 must in consequence be adequate to pump all the slurry supplied to tank 5 by pump 20 plus the amount of slurry returned to tank 5 by the Venturi tube eductor 7.

The slurry charged into tank 5′ by the Venturi tube eductor 6′ is recirculated in tank 5′ through the Venturi tube eductor 7′ and transported to tank 5″ through the Venturi tube eductor 6″ in a manner similar to that just described.

Slurry is withdrawn from tank 5″ by the pump 31″ through the line 32″, and pumped into the line 33″, whence it is in part discharged from the system through the line 38, and in part returned to tank 5″ through the Venturi tube eductor 7″. The ratio of the amount discharged through the line 38 to that returned to tank 5″ through Venturi tube eductor 7″ is appropriately controlled by proper adjustment of the pinch valves 36″ and 40. This adjustment is facilitated by the fact that the readings of pressure gauge 37″ are an indication of the rate at which slurry is supplied to the Venturi tube eductor 7″.

In order to secure uniform and continuous flow of slurry through the system, it will in general be desirable to adjust the amount of slurry discharged from the outlet 38 so that it corresponds to the amount of slurry fed into the system through the Venturi tube eductor 6.

In the practice of the invention in the apparatus illustrated in the drawing, it will generally be advantageous to recirculate the slurry at a rate that is a multiple of the rate at which slurry is transferred from tank to tank; for example, the ratio of volume of slurry recirculated to volume of slurry forwarded through the tanks may be 4 to 1, in case a zinc sulfate solution containing 30 grams of zinc (Zn) per liter is used. For this purpose, it may be advantageous in such in apparatus to construct the recirculating Venturi tube eductors 7, 7' and 7" larger than the transporting Venturi tube eductors 6, 6' and 6"; for example, the linear dimensions of 7, 7' and 7" may be twice those of 6, 6' and 6". In an apparatus having more than three tanks in series, the contemplated mixing effect may be obtained with a ratio of recirculation to forwarding of less than 4 to 1, other conditions remaining the same.

In producing a zinc sulfide precipitate as hereinbefore described, the apparatus must of course be constructed of acid resistant material on account of the formation of sulfuric acid by the reaction ($ZnSO_4+H_2S=ZnS+H_2SO_4$). Hard rubber, soft rubber and steel lined with rubber are appropriate materials.

In a practical example of the invention carried out in the apparatus illustrated in the drawing each of the precipitation tanks is 5' 6" in diameter, has an overall height of 7', and the depth of the conical bottom of the tank is 5'. Each tank is adapted to contain from 150 to 200 gallons of zinc sulfate solution or slurry of precipitated zinc sulfide in zinc sulfate and sulfuric acid solution, leaving ample room for an atmosphere of hydrogen sulfide gas above the liquid level. The Venturi tube eductors are so operated that the precipitator 6 is supplied with 20 gallons of zinc sulfate solution per minute and the transferring precipitators 6' and 6" discharge corresponding amounts of slurry. The volume of feed entering the precipitators is controlled by adjusting the pinch valves in accordance with the pressure registered by the gauges in the downcomers leading to the precipitators. The recirculating precipitators 7, 7' and 7" recirculate about 80 gallons of slurry per minute. Each Venturi tube eductor entrains from 25 to 50 volumes (or more) of gas containing at least 50% of hydrogen sulfide gas for each volume of liquor or slurry. The gas introduced into the apparatus (pipe 8") is substantially pure hydrogen sulfide (about 99.5% $H_2S$), and the exiting or spent gas (pipe 9) contains from 50 to 75% hydrogen sulfide. The volume of exiting gas is of course very substantially smaller than the volume of gas introduced through pipe 8", in consequence of the precipitating reaction, and since the only gases (other than hydrogen sulfide) entering the apparatus are relatively very small amounts of air, the efficiency of hydrogen sulfide consumption in the apparatus is about 99.5–98.5%. The zinc sulfate solution treated contains about 30 grams Zn per liter or about 75 grams $ZnSO_4$ per liter. In this operation, with three tanks in series, the slurry is mixed with hydrogen sulfide gas in an eductor from ten to fifteen times before being discharged from the apparatus, and there is substantially no short-circuiting of solution through the apparatus without adequate mixing with hydrogen sulfide gas. The slurry discharged through the outlet 38 contains about 1.5 grams unprecipitated Zn per liter, and about 4.5% sulfuric acid. The elimination of $ZnSO_4$ in the crude slurry as discharged from the precipitating system is thus 95% approximately. During the subsequent aging treatment lasting several hours in which the crude zinc sulfide precipitate is maintained in contact with the acid mother liquor, the elimination of zinc sulfate is increased to about 98% by reaction of the residual zinc sulfate with hydrogen sulfide gas adsorbed by the zinc sulfide particles and gradually desorbed during the aging.

The plant in question produces about five net tons zinc sulfide pigment per day. After aging treatment, the precipitate is separated from the mother liquor, dried, calcined and processed in a way similar to the finishing treatment of lithopone.

We claim:

1. The method of producing precipitates by the reaction of a gas with a solution which comprises passing the gas and the slurry that results from the interaction of the gas and solution through a series of tanks, withdrawing from each tank in the series and returning thereto a certain amount of slurry intimately admixed with a considerably larger volume of gas withdrawn from the tank, and withdrawing from the last tank in the series an amount of slurry substantially equivalent to the amount of solution introduced into the first tank in the series.

2. The method of producing precipitates by the reaction of a gas with a solution which comprises passing the gas and the slurry that results from the interaction of the gas and solution through a series of tanks, withdrawing from each tank in the series and returning thereto through a Venturi tube eductor a certain amount of slurry intimately admixed with a considerably larger volume of gas withdrawn from the tank by the eductor, and withdrawing from the last tank in the series an amount of slurry substantially equivalent to the amount of solution introduced into the first tank in the series.

3. The method of producing precipitates by the reaction of a gas with a solution which comprises passing the gas and the slurry that results from the interaction of the gas and solution through a series of tanks, withdrawing a certain amount of slurry from each tank in the series and returning a part of the withdrawn slurry intimately admixed with gas back into that tank and conveying the remainder of the withdrawn slurry intimately admixed with gas to the next succeeding tank in the series, and withdrawing from the last tank in the series an amount of slurry substantially equivalent to the amount of solution introduced into the first tank in the series.

4. The method of producing precipitates by the reaction of a gas with a solution which comprises passing the gas and the slurry that results from the interaction of the gas and solution through a series of tanks, withdrawing a certain amount of slurry from each tank in the series and returning thereto through a Venturi tube eductor a part of the withdrawn slurry intimately admixed with a considerably larger volume of gas withdrawn from that tank by the eductor and conveying to the next succeeding tank in the series through a Venturi tube eductor the remainder of the withdrawn slurry intimately admixed with gas withdrawn from that tank by the eductor, and withdrawing from the last tank in the series an amount of slurry substantially equivalent to the amount of solution introduced into the first tank in the series.

5. The method of producing precipitates by the reaction of a gas with a solution which comprises passing the gas and the slurry that results from the interaction of the gas and solution through a series of tanks, introducing into the first tank in the series through a Venturi tube eductor fresh solution intimately admixed with a considerably larger volume of gas withdrawn from that tank by the eductor, withdrawing a certain amount of slurry from each tank in the series and returning a part of the withdrawn slurry intimately admixed with gas back into that tank and conveying the remainder of the withdrawn slurry intimately admixed with gas to the next succeeding tank in the series, and withdrawing from the last tank in the series an amount of slurry substantially equivalent to the amount of fresh solution introduced into the first tank in the series.

6. The method of producing precipitates by the reaction of a gas with a solution which comprises passing the gas and the slurry that results from the interaction of the gas and solution through a series of tanks, introducing into the first tank in the series through a Venturi tube eductor fresh solution intimately admixed with a considerably larger volume of gas withdrawn from that tank by the eductor, withdrawing a certain amount of slurry from each tank in the series and returning thereto through a Venturi tube eductor a part of the withdrawn slurry intimately admixed with a considerably larger volume of gas withdrawn from that tank by the eductor and conveying to the next succeeding tank in the series through a Venturi tube eductor the remainder of the withdrawn slurry intimately admixed with gas withdrawn from that tank by the eductor, and withdrawing from the last tank in the series an amount of slurry substantially equivalent to the amount of fresh solution introduced into the first tank in the series.

7. The method of producing precipitates by the reaction of a gas with a solution which comprises passing the gas and the slurry that results from the interaction of the gas and solution through a series of tanks, withdrawing a certain amount of slurry from each tank in the series and returning a part of the withdrawn slurry intimately admixed with gas back into that tank and conveying the remainder of the withdrawn slurry intimately admixed with gas to the next succeeding tank in the series, regulating the relative amounts of the slurry withdrawn from each tank which are returned to that tank and conveyed to the next succeeding tank, and withdrawing from the last tank in the series an amount of slurry substantially equivalent to the amount of solution introduced into the first tank in the series.

8. The method of producing precipitates by the reaction of a gas with a solution which comprises passing the gas and the slurry that results from the interaction of the gas and solution through a series of tanks, withdrawing a certain amount of slurry from each tank in the series and returning thereto through a Venturi tube eductor a part of the withdrawn slurry intimately admixed with a considerably larger volume of gas withdrawn from that tank by the eductor and conveying to the next succeeding tank in the series through a Venturi tube eductor the remainder of the withdrawn slurry intimately admixed with gas withdrawn from that tank by the eductor, regulating the relative amounts of the slurry withdrawn from each tank which are returned to that tank and conveyed to the next succeeding tank, and withdrawing from the last tank in the series an amount of slurry substantially equivalent to the amount of solution introduced into the first tank in the series.

9. The method of producing precipitates by the reaction of a gas with a solution which comprises mixing the solution with a relatively much larger volume of the gas in an eductor discharging into an atmosphere of the gas in a closed tank partly filled with slurry resulting from the interaction of the solution and gas, and recirculating a certain amount of said slurry by mixing the slurry with a relatively much larger volume of the gas in a second eductor also discharging into the atmosphere of gas in said tank.

10. The method of producing precipitates by the reaction of a gas with a solution which comprises mixing the solution in a Venturi tube eductor with a relatively much larger volume of the gas withdrawn by the eductor from a closed tank partly filled with slurry resulting from the interaction of the solution and gas, and discharging the slurry resulting from the mixing in the eductor of the solution and gas into an atmosphere of gas above the slurry in said tank.

11. The method of producing precipitates by the reaction of a gas with a solution which comprises mixing the solution in a Venturi tube eductor with a relatively much larger volume of the gas withdrawn by the eductor from a closed tank partly filled with slurry resulting from the interaction of the solution and gas, discharging the slurry resulting from the mixing in the eductor of the solution and gas into an atmosphere of gas above the slurry in said tank, and recirculating a certain amount of the slurry in said tank by mixing the recirculating slurry in a second Venturi tube eductor, also discharging into the atmosphere of gas in said tank, with a relatively much larger volume of the gas withdrawn by the eductor from the tank.

12. The method of producing precipitates by the reaction of a gas with a solution which comprises passing the gas and slurry that results from the interaction of the gas and solution countercurrently through a series of closed tanks, mixing in a Venturi tube eductor, discharging into the atmosphere of gas above the slurry in the first tank in said series, fresh solution with a relatively much larger volume of the gas withdrawn from the tank by the eductor, withdrawing a certain amount of slurry from each tank in the series and returning a part of the withdrawn slurry mixed with gas withdrawn from the same tank back into that tank through a Venturi tube eductor discharging into the atmosphere of gas in the tank and conveying the remainder of the withdrawn slurry to the next succeeding tank in the series through a similar Venturi tube eductor, and withdrawing from the last tank in the series an amount of slurry substantially equivalent to the amount of fresh solution introduced into the first tank in the series.

13. The improvement in the precipitation of zinc sulfide by the action of hydrogen sulfide gas upon an aqueous solution of a zinc salt which comprises mixing the aqueous solution with a relatively much larger volume of hydrogen sulfide gas in an eductor discharging into an atmosphere of hydrogen sulfide gas in a closed tank partly filled with slurry resulting from the interaction of the solution and gas.

14. The improvement in the precipitation of zinc sulfide by the action of hydrogen sulfide gas upon an aqueous solution of a zinc salt which comprises mixing the slurry that results from the partial interaction of said solution and gas with a relatively much larger volume of hydrogen sulfide gas in an eductor discharging into an atmosphere of hydrogen sulfide gas in a closed tank partly filled with slurry.

15. The improvement in the precipitation of zinc sulfide by the action of hydrogen sulfide gas upon an aqueous solution of a zinc salt which comprises mixing the aqueous solution of a relatively much larger volume of hydrogen sulfide gas in an eductor discharging into an atmosphere of hydrogen sulfide gas in a closed tank partly filled with slurry resulting from the interaction of the solution and gas, and recirculating a certain amount of said slurry by mixing the slurry with a relatively much larger volume of hydrogen sulfide gas in a second eductor discharging into the atmosphere of hydrogen sulfide gas in said tank.

16. The improvement in the precipitation of zinc sulfide by the action of hydrogen sulfide gas upon an aqueous solution of a zinc salt which comprises mixing the aqueous solution in a Venturi tube eductor with a relatively much larger volume of hydrogen sulfide gas withdrawn by the eductor from a closed tank partly filled with slurry resulting from the interaction of said solution and gas, and discharging the slurry resulting from the mixing in the eductor of said solution and gas into an atmosphere of hydrogen sulfide gas above the slurry in said tank.

17. The improvement in the precipitation of zinc sulfide by the action of hydrogen sulfide gas upon an aqueous solution of a zinc salt which comprises mixing the aqueous solution in a Venturi tube eductor with a relatively much larger volume of hydrogen sulfide gas withdrawn by the eductor from a closed tank partly filled with slurry resulting from the interaction of said solution and gas, discharging the slurry resulting from the mixing in the eductor of said solution and gas into an atmosphere of hydrogen sulfide gas above the slurry in said tank, and recirculating a certain amount of the slurry in said tank by mixing the recirculating slurry in a second Venturi tube eductor, also discharging into the atmosphere of hydrogen sulfide gas in said tank, with a relatively much larger volume of hydrogen sulfide gas withdrawn by the eductor from the tank.

18. The improvement in the precipitation of zinc sulfide by the action of hydrogen sulfide upon an aqueous solution of a zinc salt which comprises introducing the solution into a tank through an eductor operating to withdraw from the tank and mix with the entering solution a relatively much larger volume of hydrogen sulfide, and conveying slurry from said tank to a second tank through an eductor operating to withdraw from the second tank and mix with the entering slurry a relatively much larger volume of hydrogen sulfide.

19. The improvement in the precipitation of zinc sulfide by the action of hydrogen sulfide upon an aqueous solution of a zinc salt which comprises introducing the solution into a tank through an eductor operating to withdraw from the tank and mix with the entering solution a relatively much larger volume of hydrogen sulfide, conveying slurry from said tank to a second tank through an eductor operating to withdraw from the second tank and mix with the entering slurry a relatively much larger volume of hydrogen sulfide, and circulating the slurry in each of said tanks through an eductor operating to withdraw from the tank and mix with the circulating slurry a relatively much larger volume of hydrogen sulfide.

20. The method of producing a precipitate of zinc sulfide by the reaction of hydrogen sulfide gas with a solution of a zinc salt which comprises passing the gas and the slurry that results from the interaction of the hydrogen sulfide and zinc salt solution countercurrently through a series of tanks, withdrawing a certain amount of slurry from each tank in the series and returning a part of the withdrawn slurry intimately admixed with gas back into that tank and conveying the remainder of the withdrawn slurry intimately admixed with gas to the next succeeding tank in the series, regulating the relative amounts of the slurry withdrawn from each tank which are returned to that tank and conveyed to the next succeeding tank, and withdrawing from the last tank in the series an amount of slurry substantially equivalent to the amount of solution introduced into the first tank in the series.

21. The method of producing a precipitate of zinc sulfide by the reaction of an aqueous solution of a zinc salt with hydrogen sulfide gas which comprises progressively conducting a slurry of the zinc sulfide precipitate resulting from the interaction of the aqueous solution of zinc salt and hydrogen sulfide gas through a series of tanks, introducing into and withdrawing from each tank zinc sulfide slurry in such relative amounts that a substantially constant level of slurry is maintained in each tank, and providing an atmosphere of hydrogen sulfide gas above and in contact with the body of zinc sulfide slurry in each tank.

22. The method of producing a precipitate of zinc sulfide by the reaction of an aqueous solution of a zinc salt with hydrogen sulfide gas which comprises progressively conducting a slurry of the zinc sulfide precipitate resulting from the interaction of the aqueous solution of zinc salt and hydrogen sulfide gas through a series of tanks, introducing into and withdrawing from each tank zinc sulfide slurry in such relative amounts that a substantially constant level of slurry is maintained in each tank, and progressively advancing a supply of hydrogen sulfide gas through said tanks in a direction generally countercurrent to the direction of passage of the zinc sulfide slurry through the tanks.

23. The method of producing a precipitate of zinc sulfide by the reaction of an aqueous solution of a zinc salt with hydrogen sulfide gas which comprises progressively conducting a slurry of the zinc sulfide precipitate resulting from the interaction of the aqueous solution of zinc salt and hydrogen sulfide gas through a series of tanks, introducing into and withdrawing from each tank zinc sulfide slurry in such relative amounts that a substantially constant level of slurry is maintained in each tank, and progressively advancing a supply of hydrogen sulfide gas through said tanks to provide an atmosphere of the gas above and in contact with the body of zinc sulfide slurry in each tank, the zinc sulfide slurry being introduced into each tank by showering the same through said atmosphere of hydrogen sulfide gas to insure intimate contact between the slurry and the gas.

ARNE J. MYHREN.
BYRON MARQUIS.